United States Patent
Han et al.

(10) Patent No.: US 10,659,273 B2
(45) Date of Patent: May 19, 2020

(54) SYNCHRONIZATION SIGNAL TRANSMISSION AND DETECTION METHOD, TRANSMISSION END, RECEIVING END, AND STORAGE MEDIUM

(71) Applicant: ZTE Corporation, Shenzhen (CN)

(72) Inventors: Xianghui Han, Shenzhen (CN); Shuqiang Xia, Shenzhen (CN); Wen Zhang, Shenzhen (CN); Bo Dai, Shenzhen (CN); Qian Dai, Shenzhen (CN); Jing Shi, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 121 days.

(21) Appl. No.: 15/773,172

(22) PCT Filed: Oct. 26, 2016

(86) PCT No.: PCT/CN2016/103400
§ 371 (c)(1),
(2) Date: May 3, 2018

(87) PCT Pub. No.: WO2017/076204
PCT Pub. Date: May 11, 2017

(65) Prior Publication Data
US 2018/0316539 A1    Nov. 1, 2018

(30) Foreign Application Priority Data

Nov. 4, 2015 (CN) .......................... 2015 1 0741271

(51) Int. Cl.
*H04L 27/26* (2006.01)
*H04L 5/00* (2006.01)
*H04W 56/00* (2009.01)

(52) U.S. Cl.
CPC ........ *H04L 27/2656* (2013.01); *H04L 5/0048* (2013.01); *H04L 27/2607* (2013.01); *H04L 27/2613* (2013.01); *H04W 56/0015* (2013.01)

(58) Field of Classification Search
CPC ............ H04L 27/2656; H04L 27/2607; H04L 27/2613; H04L 5/0048; H04W 56/0015
See application file for complete search history.

(56) References Cited

U.S. PATENT DOCUMENTS 8,170,592 B2   5/2012 Swarts
8,583,155 B2   11/2013 Swarts
(Continued)

FOREIGN PATENT DOCUMENTS

CN         1983860 A    6/2007
CN       101005477 A    7/2007
(Continued)

OTHER PUBLICATIONS

International Search Report in international application No. PCT/CN2016/103400, dated Feb. 7, 2017.
(Continued)

*Primary Examiner* — Habte Mered
(74) *Attorney, Agent, or Firm* — Li & Cai Intellectual Property (USA) Office

(57) ABSTRACT

Embodiments of the present invention disclose a synchronization signal transmission and detection method, transmission end, and receiving end. The synchronization signal transmission method includes: transmitting on M consecutive transmission symbols, a synchronization signal or a part of the synchronization signal, wherein M is an integer not less than 2, the transmission symbols include a cyclic prefix and a useful symbol portion, and the content carried in the cyclic prefix is the content in the last part of the useful
(Continued)

symbol. The embodiments of the present invention also provide a computer storage medium.

18 Claims, 4 Drawing Sheets

(56) References Cited

U.S. PATENT DOCUMENTS

| | | | |
|---|---|---|---|
| 2007/0165728 A1 | 7/2007 | Parizhsky | |
| 2009/0135803 A1* | 5/2009 | Luo | H04L 5/0007 370/350 |
| 2010/0069106 A1 | 3/2010 | Swarts | |
| 2010/0202574 A1* | 8/2010 | Chen | H04L 27/2647 375/343 |
| 2011/0158342 A1* | 6/2011 | Srinivasan | H04L 25/0212 375/285 |
| 2012/0275379 A1 | 11/2012 | Swarts | |
| 2016/0043890 A1* | 2/2016 | Simon | H04L 27/2649 375/260 |
| 2018/0091249 A1* | 3/2018 | Han | H04L 27/2613 |

FOREIGN PATENT DOCUMENTS

| | | |
|---|---|---|
| CN | 101375571 A | 2/2009 |
| CN | 101552762 A | 10/2009 |
| CN | 101656700 A | 2/2010 |
| CN | 101719890 A | 6/2010 |
| CN | 103379082 A | 10/2013 |
| KR | 20150072983 A | 6/2015 |
| WO | 2015093711 A1 | 6/2015 |

OTHER PUBLICATIONS

English Translation of the Written Opinion of the International Search Authority in international application No. PCT/CN2016/103400, dated Feb. 7, 2017.

* cited by examiner

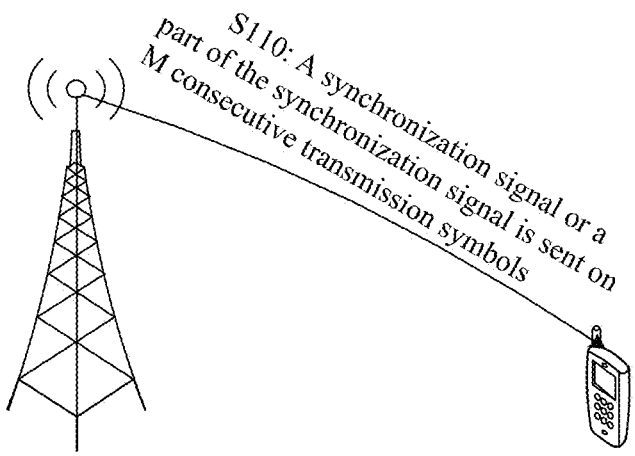
FIG. 1
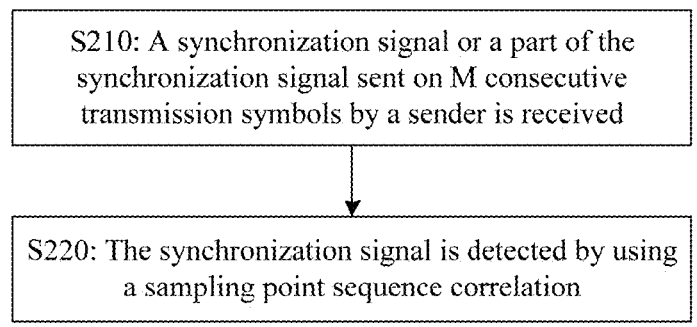
FIG. 2
| | Transmission symbol 0 | Transmission symbol 1 | Transmission symbol 2 |
|---|---|---|---|
| Sending mode 1 | f,g ¦ a,b,c,d,e,f,g | f,g ¦ a,b,c,d,e,f,g | f,g ¦ a,b,c,d,e,f,g |
FIG. 3A

|  | Transmission symbol 0 | | Transmission symbol 1 | | Transmission symbol 2 | |
|---|---|---|---|---|---|---|
| Sending mode 2 | e,f,g | a,b,c,d,e,f,g | e,f,g | a,b,c,d,e,f,g | e,f,g | a,b,c,d,e,f,g |

FIG. 3B

| Transmission symbol 0 | | Transmission symbol 1 | | Transmission symbol 2 | |
|---|---|---|---|---|---|
| g,a,b | c,d,e,f,g,a,b | c,d | e,f,g,a,b,c,d | e,f,g | a,b,c,d,e,f,g |
| ↑ $x_1$ | ↑ $x_2$ | | | ↑ $y_1$ | ↑ $y_2$ |

FIG. 4

|  | Transmission symbol 0 | | Transmission symbol 1 | | Transmission symbol 2 | | Transmission symbol 3 | |
|---|---|---|---|---|---|---|---|---|
| Sending mode q | g,a | b,c,d,e,f,g,a | b,c | d,e,f,g,a,b,c | d,e | f,g,a,b,c,d,e | f,g | a,b,c,d,e,f,g |
|  | ↑ $x_3$ | | | | | | | ↑ $y_3$ |

FIG. 5

|  | Transmission symbol 0 | | Transmission symbol 1 | | Transmission symbol 2 | |
|---|---|---|---|---|---|---|
| Sending mode 0 | b,c | d,e,f,g,a,b,c | d,e | f,g,a,b,c,d,e | f,g | a,b,c,d,e,f,g |

|  | Transmission symbol 0 | | Transmission symbol 1 | | Transmission symbol 2 | |
|---|---|---|---|---|---|---|
| Sending mode 1 | -f,-g,-a | -b,-c,-d,-e,-f,-g,-a | -b,-c,-d | -e,-f,-g,-a,-b,-c,-d | e,f,g | a,b,c,d,e,f,g |

|  | Transmission symbol 0 | | Transmission symbol 1 | | Transmission symbol 2 | |
|---|---|---|---|---|---|---|
| Sending mode 2 | a,b | c,d,e,f,g,a,b | -c,-d | -e,-f,-g,-a,-b,-c,-d | -e,-f,-g | -a,-b,-c,-d,-e,-f,-g |

FIG. 6

|  | Transmission symbol 0 | | Transmission symbol 1 | |
|---|---|---|---|---|
| Sending mode 0 | d,e | f,g,a,b,c,d,e | f,g | a,b,c,d,e,f,g |

|  | Transmission symbol 0 | | Transmission symbol 1 | |
|---|---|---|---|---|
| Sending mode 1 | b*,c*,d* | e*,f*,g*,a*,b*,c*,d* | e*,f*,g* | a*,b*,c*,d*,e*,f*,g* |

FIG. 7

| Transmission symbol 0 | | Transmission symbol 1 | | Transmission symbol 2 | |
|---|---|---|---|---|---|
| b,c | d,e,f,g,a,b,c | d,e | f,g,a,b,c,d,e | f,g | a,b,c,d,e,f,g |

Sending mode 0

+1   +1   +1   +1

+1   -1   +1   -1

Sending mode 1

| f,g,a | b,c,d,e,f,g,a | b,c,d | e,f,g,a,b,c,d | e,f,g | a,b,c,d,e,f,g |
|---|---|---|---|---|---|

Transmission symbol 0    Transmission symbol 1    Transmission symbol 2

FIG. 8

SYNCHRONIZATION SIGNAL TRANSMISSION AND DETECTION METHOD, TRANSMISSION END, RECEIVING END, AND STORAGE MEDIUM

TECHNICAL FIELD

The disclosure relates to a synchronization technology in a field of wireless communications, and in particular to a synchronization signal sending and detection method, a sender, a receiver, and a storage medium.

BACKGROUND

In an Orthogonal Frequency-Division Multiplexing (OFDM) system, each OFDM symbol includes two parts: a Cyclic Prefix (CP) and a useful symbol part. The CP is usually a repetition of a last portion of data in the useful symbol part. In order to apply to different channel environments, a CP length of an OFDM technology-based communication system usually has multiple options.

For example, in a Long Term Evolution (LTE) system adopting an OFDM technology, two types of CPs are supported. For an application scenario of ultra-long-range coverage or multicast information transmission or broadcast information transmission, the system will select a long-CP symbol. At this time, a slot (0.5 ms) includes 6 OFDM symbols, and a CP length of each OFDM symbol is 16.67 us.

For other applications, a communication system will select a short-CP symbol. At this time, a slot includes 7 OFDM symbols, a CP length of the first OFDM symbol of the slot is 5.21 us, and a CP length of other OFDM symbols is 4.69 us.

When a receiver initially accesses an OFDM system, it generally receives a sent signal (commonly referred to as a synchronization signal) to obtain initial synchronization (including OFDM symbol synchronization, frame synchronization, frequency offset correction, cell number identification or the like) with the system. However, the diversity of the aforementioned CP lengths brings a lot of trouble to the synchronization process of the receiver. The receiver has not yet got in touch with the OFDM system and naturally will not know the type of the CP length selected by the OFDM system. For this, there are three solutions as follows.

Solution 1: The receiver tries according to all possible CP types, which will cause exponential increase of the complexity of the synchronization process of the receiver, and is very unfavorable for reducing the power consumption and cost of the receiver. This is especially obvious for a machine type communication receiver.

Solution 2: A synchronization signal is always sent by using a certain agreed CP type. Although this solution reduces the complexity of the synchronization process, it places great restrictions on the scheduling of the system. For example, the aforementioned Narrow Band (NB)-LTE system and LTE system coexist in the same frequency spectrum. For example, in an LTE system with a system bandwidth of 20 MHz, a bandwidth of 180 kHz is allocated for sending signals of an NB-LTE system. However, due to the difference between service receivers of the NB-LTE system and the LTE system, the requirements for CP types are also different. If the CP type of the LTE system is forced to be consistent with the CP type, for sending a synchronization signal, of the NB-LTE system, it inevitably leads to a significant drop in the efficiency of the LTE system.

Solution 3: A synchronization signal is always sent on a last symbol in a slot. This method is a method employed by an existing LTE system (in an LTE system, a Primary Synchronization Signal (PSS) for symbol timing is on a last OFDM symbol in a slot). At the same time, the defects of the above two solutions are avoided. However, this method requires that a synchronization signal must be sent on only one OFDM symbol in a slot. For the aforementioned NB-LTE system, the bandwidth thereof may be only 180 kHz. If it is defined that the synchronization signal can be sent on only one OFDM symbol in a slot, the energy of a synchronization signal received by the receiver for a single time is very limited, and the receiver often needs to accumulatively receive synchronization signals of a plurality of slots to realize synchronization with the system. Compared with the existing LTE system, this will significantly increase the power consumption and synchronization time of the receiver, and also reduce the efficiency of the aforementioned narrowband system.

In the above solutions, in order to increase receiving performance of a synchronization signal, in some cases, synchronization signal will be sent on consecutive OFDM symbols. Because CP lengths of these OFDM symbols are different, the implementation of signal detection and synchronization processing in the synchronization process is more complicated, more processing resources and power are consumed, and the problem becomes more prominent.

SUMMARY

In view of this, the embodiments of the disclosure are intended to provide a synchronization signal sending and detection method, a sender, a receiver, and a storage medium, for at least partially solving one of the above problems.

The technical solution of the disclosure is implemented as follows.

According to a first aspect of the embodiments of the disclosure, a synchronization signal sending method is provided. The method includes the steps as follows.

A synchronization signal or a part of the synchronization signal is sent on M consecutive transmission symbols, wherein M is an integer no less than 2; and each of the transmission symbols includes a CP and a useful symbol part, and content carried in the CP is a last portion of content carried in the useful symbol part.

According to a second aspect of the embodiments of the disclosure, a synchronization signal detection method is provided. The method includes the steps as follows.

A synchronization signal or a part of the synchronization signal sent on M consecutive transmission symbols by a sender is received, wherein M is an integer no less than 2, each of the transmission symbols includes a CP and a useful symbol part, and content carried in the CP is a last portion of content carried in the useful symbol part.

The synchronization signal is detected by using a sampling point sequence correlation.

According to a third aspect of the embodiments of the disclosure, a sender is provided. The sender includes:

a sending unit, configured to send a synchronization signal or a part of the synchronization signal on M consecutive transmission symbols, wherein M is an integer no less than 2; and each of transmission symbols includes a CP and a useful symbol part, and content carried in the CP is a last portion of content carried in the useful symbol part.

According to a fourth aspect of the embodiments of the disclosure, a receiver is provided. The receiver includes:

a receiving unit, configured to receive a synchronization signal or a part of the synchronization signal sent on M consecutive transmission symbols by a sender, wherein M is an integer no less than 2, each of the transmission symbols includes a CP and a useful symbol part, and content carried in the CP is a last portion of content carried in the useful symbol part; and a detection unit, configured to detect the synchronization signal by using a sampling point sequence correlation.

According to a fifth aspect of the embodiments of the disclosure, a computer storage medium is provided. The computer storage medium stores a computer-executable instruction, the computer-executable instruction being used for at least one of the aforementioned methods.

According to the synchronization signal sending and detection method, the sender, the receiver, and the storage medium in the embodiments of the disclosure, a synchronization signal or a part of the synchronization signal is sent on M consecutive transmission symbols. Thus, the receiver will receive the synchronization signal on the M consecutive transmission symbols. Therefore, the receiving gain is increased, and the synchronization accuracy can be improved.

BRIEF DESCRIPTION OF DRAWINGS

FIG. 1 is a flowchart of a synchronization signal sending method according to an embodiment of the disclosure.

FIG. 2 is a flowchart of a synchronization signal detection method according to an embodiment of the disclosure.

FIG. 3A and FIG. 3B are schematic diagrams illustrating effects of a first Q sending modes according to an embodiment of the disclosure.

FIG. 4 is a schematic diagram illustrating effects of a second Q sending modes according to an embodiment of the disclosure.

FIG. 5 is a schematic diagram illustrating effects of a third Q sending modes according to an embodiment of the disclosure.

FIG. 6 is a schematic diagram illustrating effects of a fourth Q sending modes according to an embodiment of the disclosure.

FIG. 7 is a schematic diagram illustrating effects of a fifth Q sending modes according to an embodiment of the disclosure.

FIG. 8 is a schematic diagram illustrating effects of an eighth Q sending modes according to an embodiment of the disclosure.

DETAILED DESCRIPTION

Figure 9:
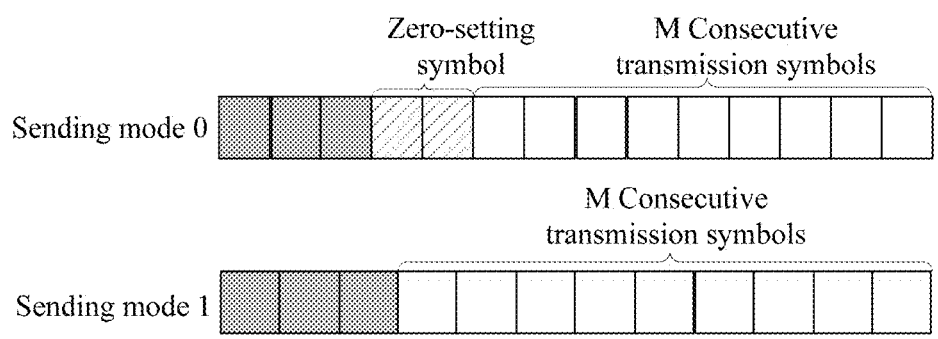
FIG. 9 is a schematic diagram illustrating effects of a ninth Q sending modes according to an embodiment of the disclosure.

The following further describes the technical solution of the disclosure in detail with reference to the accompanying drawings of the specification and specific embodiments. It should be understood that the preferred embodiments described below are only used to illustrate and explain the disclosure, and are not intended to limit the disclosure.

As shown in FIG. 1, the present embodiment provides a synchronization signal sending method. The method includes the steps as follows.

At S110, a synchronization signal or a part of the synchronization signal is sent on M consecutive transmission symbols, wherein M is an integer no less than 2; and each of the transmission symbols includes a CP and a useful symbol part, and content carried in the CP is a last portion of content carried in the useful symbol part.

The synchronization signal sending method of the present embodiment may be applied to a base station. In the present embodiment, the method is particularly applicable to narrowband transmission. In the present embodiment, a synchronization signal or a part of the synchronization signal will be sent on M transmission symbols. In this case, a receiver can receive a synchronization signal from at least M transmission symbols, which may increase the receiving gain, thereby improving the accuracy of correctly receiving the synchronization signal for better symbol synchronization, frame synchronization or slot synchronization.

In the present embodiment, the transmission symbol may be a symbol for transmitting information, and the transmission symbol may include an OFDM symbol. The transmission symbol in the present embodiment is divided into two parts, the former part is a CP and the latter part is a useful symbol part; and content carried in the CP is a last portion of content carried in the useful symbol part. For example, the OFDM symbol includes 7 sampling points; the first two points are the CP; the last 5 points are the useful symbol part. In this case, the first two sampling points of the OFDM symbol are as same as a last two points of the OFDM symbol. In the present embodiment, the CP includes S sampling points, where S is an integer equal to or greater than 0. Here, the S sampling points constitute the CP. The S sampling points may be used for cyclic check at the receiver. In the present embodiment, when the transmission symbol does not carry a CP, S is equal to 0.

In the present embodiment, there are Q sending modes for sending the synchronization signal; the Q is an integer no less than 2, where a CP length of at least one of the M transmission symbols in any one of the sending modes is different from that in any other of the sending modes. In the present embodiment, the method may further include: selecting a sending mode for sending a synchronization signal according to a negotiation or according to a current sending requirement. In the Q sending modes in the present embodiment, the CP length of at least one of the M transmission symbols in any one of the sending modes is different from that in any other of the sending modes. For example, Q=2; and M=3; and if a CP length of the three transmission symbols in the first sending mode is three sampling points, in the second sending mode, a CP length of at least one transmission symbol is not 3. In this way, the receiver may distinguish different sending modes by different CPs.

In some embodiments, at least one common transmission symbol exists in M transmission symbols corresponding to each of the Q sending modes; and content carried in a useful symbol part of a common transmission symbol in any one of the sending modes is as same as or opposite to or conjugate to that in any other of the sending modes. In this case, a certain cyclic shift is formed on useful symbol parts of different transmission symbols according to a prefix length, so that the content received at the receiver is a continuous sequence consisting of at least M-times repetitions of useful symbol parts without being affected by the prefix length. In this case, the receiver may implement transmission symbol synchronization, slot synchronization or frame synchronization without CP removing operation, which may reduce the complexity; and through further configuration, the receiver may distinguish CP types by receiving a synchronization signal without the CP removing operation, thereby improving synchronization accuracy.

Of course, the contents of the common transmission symbols corresponding to the Q sending modes are correlated, which is favorable for the sender to distinguish and correlate various sending modes.

Moreover, in the present embodiment, for a common transmission symbol $m_q$ in a sending mode q, $m_q$ is 0 or a positive integer less than M. The useful symbol part of the common transmission symbol $m_q$ carries $x_{m_q}(n)$, where n is 0 or a positive integer less than N; q is 0 or a positive integer less than Q; N is a positive integer, which is a number of sampling points included in the useful symbol part of the transmission symbol $m_q$; and a useful symbol part of a transmission symbol k in the sending mode q is obtained by multiplying a cyclic shift of $x_{m_q}(n)$ by 1 or −1, or by conjugating a cyclic shift of $x_{m_q}(n)$. In this way, it is convenient and simple to determine the content carried in other transmission symbols according to the content carried in the useful symbol part of the common transmission symbol.

Alternatively, a useful symbol part of a transmission symbol $k_q$ in the transmission symbols of the sending mode q is $x_{k_q}(n)$, $k_q$ is 0 or a positive integer less than M and not equal to $m_q$.

When $k_q < m_q$, $$x_{k_q}(n) = A_{k_q} \cdot x_{m_q}\left(\mathrm{mod}\left(N + n - \sum_{i=k_q+1}^{m_q} L(i), N\right)\right),$$

where $A_{k_q}$ is a preset parameter that is not 0, $A_{k_q}$ here may be 1 or −1, and the mod is modulo.

When $k_q > m_q$, $$x_{k_q}(n) = B_{k_q} \cdot x_{m_q}\left(\mathrm{mod}\left(n - \sum_{i=m_q+1}^{k_q} L(i), N\right)\right),$$

where $B_{k_q}$ is a preset parameter that is not 0.

L(i) is a length of a CP of an $i^{th}$ transmission symbol, where L(i) is an integer equal to or greater than 0. The specific value of $B_{k_q}$ here may be 1 or −1.

As a preferred embodiment, useful symbol parts of common symbols of q modes carry a same content, $A_{k_q}$ is 1, and $B_{k_q}$ is 1. In this case, the receiver does not need to distinguish a CP type and a sending mode, and may quickly decode a synchronization signal by directly using M-times repetitions of the useful symbol part to achieve symbol synchronization, or slot synchronization, or frame synchronization.

In some embodiments, the useful symbol parts of the common symbols of q modes carry the same or opposite contents, and $A_{k_q}$ and $B_{k_q}$ are +1 or −1. In this case, the common symbols may be set to be the same or different according to the sender, and according to the configurations of $A_{k_q}$ and $B_{k_q}$, the receiver uses M-times repetitions or (M+C)-times repetitions of the useful symbol to decode the synchronization signal, so that different transmission modes and CP types may be distinguished when synchronization is implemented.

In some embodiments, a useful symbol part of a $k_q^{th}$ transmission symbol in the transmission symbols of the sending mode q is $x_{k_q}(n)$, $k_q$ is 0 or a positive integer less than M and not equal to $m_q$.

When $k_q < m_q$, $$x_{k_q}(n) = A'_{k_q} \cdot x^*_{m_q}\left(\mathrm{mod}\left(N + n - \sum_{i=k_q+1}^{m_q} L(i), N\right)\right),$$

where $A'_{k_q}$ is a preset parameter that is not 0, $A'_{k_q}$ here may be 1 or −1.

When $k_q > m_q$, $$x_{k_q}(n) = B'_{k_q} \cdot x^*_{m_q}\left(\mathrm{mod}\left(n + \sum_{i=m_q+1}^{k_q} L(i), N\right)\right),$$

where $B'_{k_q}$ is a preset parameter that is not 0.

L(i) is the length of a CP of an $i^{th}$ transmission symbol, where L(i) is an integer equal to or greater than 0. Similarly, $B'_{k_q}$ here may be 1 or −1. Preferably, $A'_{k_q}$ is equal to 1, and $B'_{k_q}$ is also equal to 1.

$$x^*_{m_q}\left(\mathrm{mod}\left(N + n - \sum_{i=k_q+1}^{m_q} L(i), N\right)\right)$$

is the conjugate of $$x_{m_q}\left(\mathrm{mod}\left(N + n - \sum_{i=k_q+1}^{m_q} L(i), N\right)\right).$$

The content carried on M transmission symbols is constructed by using the above formula in the present embodiment, and the receiver does not perform the operation of removing a CP on a transmission symbol when detecting a synchronization signal carried in the transmission symbol, so that the complexity in extraction of the synchronization signal may be reduced, and the efficiency of detecting the synchronization signal is improved; moreover, different sending modes may be distinguished according to the contents of the CP and the useful symbol part, thereby improving the synchronization accuracy.

In the present embodiment, in order to facilitate symbol synchronization and facilitate the determination of the content of the synchronization signal carried in each transmission symbol, it is preferable that $m_q$ is equal to M−1. That is, the common transmission symbol is a last transmission symbol of M consecutive transmission symbols.

In some embodiments, the transmission symbol $m_q$ is a last transmission symbol in a transmission slot or a transmission subframe. This facilitates slot synchronization or frame synchronization between the receiver and the sender.

S110 may specifically include the following two modes.

First Mode:

S110 may include: the synchronization signal is sent on M consecutive transmission symbols.

Second Mode:

S110 may include: the M consecutive transmission symbols are sent at each of X mutually-spaced time domain positions, wherein each transmission symbol is used to send a corresponding part of the synchronization signal, where X is an integer no less than 1. Obviously in the present embodiment, the sender sends the M consecutive transmission symbols at each of X discontinuous time points at each time, which further improves the probability that the receiver detects the synchronization signal, and achieves more accurate synchronization.

In the present embodiment, M consecutive transmission symbols at a time domain position x are V(x), and the sender multiplies the synchronization signal of a time domain position x by a preset scrambling code r(x), where x is a positive integer less than X, where different sending modes correspond to different preset scrambling codes which can be used for the receiver to distinguish different sending modes.

A subframe in which the M transmission symbols for sending the synchronization signal are located is a first subframe; and the first subframe further includes a control symbol for transmitting control information.

The method also includes the step as follows.

All or part of remaining transmission symbols other than the M transmission symbols and the control symbol in the first subframe are used to transmit a specified value.

At least one of a number of specified values in the remaining transmission symbols or positions of the specified values in the remaining transmission symbols in any one of the sending modes is different from that in any other of the sending modes.

The specified value here may be 0 or 1. The control symbol is usually a starting symbol of the first subframe. The 'first' of the first subframe here is used to refer to a subframe in which the M transmission symbols are located. In addition to transmission symbols for transmitting the synchronization signal and control symbols in the first subframe, part or all of the remaining transmission symbols are used to transmit the specified value, and the position of the specified value in the remaining transmission symbols or the number of the specified values refers to the sending mode, which is favorable for a terminal to subsequently determine the sending mode of the synchronization signal according to the transmission content on the remaining transmission symbols.

As shown in FIG. 2, the present embodiment provides a synchronization signal detection method. The method includes the steps as follows.

At S210, a synchronization signal or a part of the synchronization signal sent on M consecutive transmission symbols by a sender is received, wherein M is an integer no less than 2, each of the transmission symbols includes a CP and a useful symbol part, and content carried in the CP is a last portion of content carried in the useful symbol part.

At S220, the synchronization signal is detected by using a sampling point sequence correlation.

The synchronization signal detection method of the present embodiment is applied to a receiver, and usually applied to a terminal such as a mobile phone. In the present embodiment, at S210, the receiver will continuously receive M transmission symbols once, and detect a synchronization signal from the received M transmission symbols through sampling point sequence correlation.

Because the M transmission symbols are used to send a synchronization signal or a corresponding part of the synchronization signal, the receiving gain of the receiver may be increased, thereby increasing the probability that the receiver correctly detects the synchronization signal, and improving the synchronization accuracy. In the present embodiment, the M transmission symbols are consecutive transmission symbols, thereby being favorable for the sender to send once, and for the receiver to receive and detect once.

Alternatively, at least one common transmission symbol exists in M transmission symbols corresponding to each of the Q sending modes; and content carried in a useful symbol part of a common transmission symbol in any one of the sending modes is as same as or opposite to or conjugate to that in any other of the sending modes.

In the present embodiment, because M transmission symbols are used to send a synchronization signal or a corresponding part of the synchronization signal, and a certain cyclic shift is formed on useful symbol parts of different transmission symbols according to a prefix length, the content received at the receiver is a continuous sequence consisting of at least M-times repetitions of useful symbol parts without being affected by the prefix length. In this case, the receiver may implement transmission symbol synchronization, slot synchronization or frame synchronization without CP removing operation, which may reduce the complexity; and through further configuration, the receiver may distinguish CP types by receiving a synchronization signal without the CP removing operation, thereby improving synchronization accuracy.

For the M transmission symbols of the Q sending modes, S220 has multiple implementations. Two implementations are provided as follows.

First Implementation:

S220 includes: the synchronization signal is detected by performing a sliding accumulative correlation on a useful symbol part of the common transmission symbol, serving as the sampling point sequence, and a received sequence.

Second Implementation:

S220 may include: the synchronization signal is detected by performing a sliding correlation on M-times repetitions of a useful symbol part of the common transmission symbol and the received sequence.

In the present embodiment, a useful symbol part of a common transmission symbol in multiple sending modes may be set in a terminal according to a communication protocol or a pre-negotiated or default preset configuration as the sampling point sequence between the receiver and the sender. In the present embodiment, the first method is adopted. Because the number of sampling points included in the useful symbol part of the common transmission symbol is less than the number of sampling points included in one transmission symbol, the sampling point sequence is slidably correlated to the received sequence, all sliding correlation values are accumulated, and the synchronization signal carried by the transmission symbol is determined. For a specific implementation of the above sliding correlation, reference can be made to any sliding correlation in the related art. In the second method, the useful symbol part of the common transmission symbol is repeated by M times. It is assumed that the useful symbol part of the common transmission symbol has Y sampling points, and the length of a sampling point sequence in this case may be M*Y. At this time, when a synchronization signal is detected, the synchronization signal can be detected simply by perform the sliding correlation.

Alternatively, S220 may include:

the sampling point sequence is determined according to preset configuration parameters, wherein a length of the sampling point sequence is N*M, where N is a number of sampling points of a useful symbol part in the transmission symbol; or, the length of the sampling point sequence is N*(M+C), where C is an integer no less than 1.

The preset configuration parameters herein may be a sampling point sequence for detecting Q sending modes. In the present embodiment, the sampling point sequence for detecting each sending mode is determined according to the preset configuration parameters, and blind detection is performed by using these sampling point sequences and the received sequence, so that the synchronization signal is determined. The value of C is different depending on a sending mode.

In some embodiments, S210 may include: the synchronization signal is sent on M consecutive transmission symbols. At this time, each transmission symbol carries a complete synchronization signal.

Of course, S210 may further include: M transmission symbols are received at each of X mutually-spaced time domain positions, wherein each transmission symbol is used to send a corresponding part of the synchronization signal. However, two adjacent transmission symbols in M consecutive transmission symbols transmit a complete synchronization signal, or transmission symbols at multiple time domain positions transmit at least one complete synchronization signal.

In this case, the receiver may receive and detect the synchronization signal on multiple mutually-spaced time domain positions to achieve synchronization.

In some embodiments, the method further includes: the transmission symbol is descrambled by using a preset scrambling code. The preset scrambling code described in the present embodiment is also preconfigured in advance at the receiver. In the present embodiment, the receiver may use the preset scrambling code to perform descrambling after receiving the transmission symbol. In addition, if descrambling is successful, the method further includes: a sending mode for sending the synchronization signal is determined according to a preset scrambling code that correctly descrambles the transmission symbol and a mapping relationship between the preset scrambling code and the sending mode. In this case, in S220, the receiver may determine the sampling point sequence for detecting synchronization signal according to the sending mode, so that the detection operation of the synchronization signal may be simplified, and the detection efficiency is improved.

A subframe in which the M transmission symbols for sending the synchronization signal are located is a first subframe; and the first subframe further includes a control symbol for transmitting control information.

The method also includes the step as follows.

Specified values transmitted in all or part of remaining transmission symbols other than the M transmission symbols and the control symbols in the first subframe are received.

The sending mode of the synchronization signal is determined according to a number of specified values and/or positions of the specified values in the remaining transmission symbols.

The specified value here may be 0 or 1. The control symbol is usually a starting symbol of the first subframe. The 'first' of the first subframe here is used to refer to a subframe in which the M transmission symbols are located. In addition to transmission symbols for transmitting the synchronization signal and control symbols in the first subframe, part or all of the remaining transmission symbols are used to transmit the specified value, and the position of the specified value in the remaining transmission symbol or the number of the specified values refers to the sending mode, which is favorable for a terminal to subsequently determine the sending mode of the synchronization signal according to the transmission content on the remaining symbols.

In combination with any technical solution in any of the aforementioned embodiments, several specific examples are provided as follows.

Example 1

FIG. 3A and FIG. 3B show schematic diagrams of sending a synchronization signal on consecutive M=3 transmission symbols, wherein the contents of the three transmission symbols are the same, and the content of CPs and useful symbol parts of the three transmission symbols are respectively consistent. The CP length of the transmission symbols as shown in FIG. 3A is different from the prefix of the transmission symbols as shown in FIG. 3B. It is assumed that at a specific sampling frequency, the useful symbol parts of all transmission symbols in sending mode 1 include N=7 sampling points (a,b,c,d,e,f,g), and the CP includes L=2 sampling points (f,g). The useful symbol parts of all transmission symbols in sending mode 2 include N=7 sampling points (a,b,c,d,e,f,g), and the CP includes L=3 sampling points (e,f,g).

When the synchronization signal is sent, the receiver uses a local synchronization sequence (a,b,c,d,e,f,g) and a receiving sequence to perform sliding accumulation correlation to extract the synchronization signal.

Example 2

FIG. 4 shows a schematic diagram of sending a synchronization signal on consecutive M=3 symbols with CPs based on a cyclic shift method. FIG. 4 exemplarily shows a mode in Q sending modes. It is assumed that there are two CP lengths in this sending mode, and $m_q=2$ (other symbols are cyclic shifts of this transmission symbol). It is assumed in FIG. 4 that at a specific sampling frequency, the useful symbol part of all transmission symbols includes N=7 sampling points, and the number of sampling points of a CP from transmission symbol 0 to transmission symbol 2 is 3, 2, and 3 respectively.

If sampling points of a useful symbol part of transmission symbol 2 are (a,b,c,d,e,f,g) and its prefix length is 3, the content of the prefix part is (e,f,g). Transmission symbol 0 ($k_2=0$) and transmission symbol 1 ($k_2=1$) may be obtained respectively according to the formula provided by the embodiments of the disclosure:

$$x_{k_2}(n) = A_{k_2} \cdot x_{m_2}\left(\mod\left(N + n - \sum_{i=k_2+1}^{m_2} L(i), N\right)\right),$$

where $A_{k_q}$ is a preset parameter of 1, and k=0, 1.

As can be seen in FIG. 4, the useful symbol part and the prefix part of three consecutive transmission symbols are linked together to form a sequence (a,b,c,d,e,f,g, a,b,c,d,e, f,g, a,b,c,d,e,f,g), that is, a sampling point sequence from position x2 to position y2. Therefore, the receiver may not care about the existence of several CP types and each type of CP length in this sending mode, and may use the sequence (a,b,c,d,e,f,g, a,b,c,d,e,f,g, a,b,c,d,e,f,g) to perform sliding correlation or use (a,b,c,d,e,f,g) to perform sliding accumulation on consecutive 21 sampling points. This method reduces the blind detection count and reduces the complexity.

It needs to be further explained that when the CP length is large, multiple consecutive transmissions obtained through cyclic shift may result in one or more additional useful symbol contents, such as a sampling point sequence between the position x1 and a symbol before position x2 in FIG. 4. Therefore, the receiver will detect that two peaks correspond to two symbol timings, but the receiver may determine that which one will be discarded according to a predefined $m_q$ value (preferably, the transmission symbol $m_q$ is the last symbol located in a slot or a subframe). For M transmission symbols shown in FIG. 4, the peak obtained by a sampling point sequence between positions x1 and y1 will be discarded, thereby determining a symbol timing position as y2.

In the present example, the sender uses one of the Q synchronization signal sending modes once, and the receiver does not distinguish mode types used by the sender, but only uses the correlation calculation to obtain symbol synchronization timings.

Example 3

FIG. 5 shows a schematic diagram of sending a predefined synchronization signal on consecutive M=4 symbols with CPs based on a cyclic shift method. The example assumes that a sender has Q predefined modes, and $m_q$=3. FIG. 5 shows one of predefined sending modes, and a receiver may distinguish mode types and determine symbol synchronization timings through correlation detection. In FIG. 5, it is assumed that there is only one CP length in this sending mode q, and at a specific sampling frequency, the useful symbol part includes N=7 sampling points, and the number of sampling points of a CP is 2.

If sampling points of a useful symbol part of transmission symbol 3 are (a,b,c,d,e,f,g) and its prefix length is 3, the content of the prefix part is (e,f,g). If q=3, transmission symbol 0 ($k_3$=0), transmission symbol 1 ($k_3$=1) and transmission symbol 2 ($k_q$=2) may be obtained respectively according to the following formula:

$$x_{k_3}(n) = A_{k_3} \cdot x_{m_3}\left(\mathrm{mod}\left(N+n-\sum_{i=k_3+1}^{m_3} L(i), N\right)\right),$$

where $A_{k_q}$ is a preset parameter of 1.

As can be seen in FIG. 5, the useful symbol part and the prefix part of four consecutive transmission symbols in the sending mode q are linked together to form quintuple repetitions of a sequence (a,b,c,d,e,f,g), namely a sampling point sequence between position x3 and position y3. That is, it is shown that C is equal to 1 at this time.

Therefore, the receiver may use quintuple repetitions of the sequence (a,b,c,d,e,f,g) to correlate to a receiving sequence or use (a,b,c,d,e,f,g) to perform sliding correlation on 35 consecutive sampling points.

This method not only eliminates the CP removing operation, but also makes full use of the CP content to constitute repetitions of more than 4 (5) useful symbol sequences, which improves the correlation detection peak and further improves the synchronization accuracy.

Example 4

FIG. 6 shows a schematic diagram of a synchronization signal of three sending modes. FIG. 6 shows a schematic diagram of sending a predefined synchronization signal on consecutive M=3 symbols with CPs based on a cyclic shift method. It is assumed that there are two CP lengths in three sending modes, and $m_q$=2 (other transmission symbols are cyclic shifts of this symbol). Without loss of generality, it is assumed in FIG. 6 that at a specific sampling frequency, the useful symbol parts of all transmission symbols in the three modes include N=7 sampling points. The number of sampling points in the CP part of sending mode 0 is 2, the number of sampling points in the CP part in sending mode 1 is 3, and the number of sampling points in the CP of symbols 0 to 2 in sending mode 2 is 2, 2, and 3.

For sending mode 0 (that is, q=0), if sampling points of a useful symbol part of symbol 2 are (a,b,c,d,e,f,g) and its prefix length is 2, the content of the prefix part is (f,g). Transmission symbol 0 (k=0) and transmission symbol 1 (k=1) may be obtained respectively according to the formula of the disclosure:

$$x_{k_0}(n) = A_{k_0} \cdot x_{m_0}\left(\mathrm{mod}\left(N+n-\sum_{i=k_0+1}^{m_0} L(i), N\right)\right),$$

where $A_{k_0}$ is a preset parameter, $k_0$=0, 1, and $A_{k_0}$=1.

For sending mode 1, if sampling points of a useful symbol part of transmission symbol 2 are (a,b,c,d,e,f,g) and its prefix length is 3, the content of the prefix part is (e,f,g). Transmission symbol 0 ($k_1$=0) and transmission symbol 1 ($k_1$=1) may be obtained respectively according to the formula provided in the embodiments of the disclosure:

$$x_{k_1}(n) = A_{k_1} \cdot x_{m_1}\left(\mathrm{mod}\left(N+n-\sum_{i=k_1+1}^{m_1} L(i), N\right)\right),$$

where $A_{k_1}$ is a preset parameter, $A_{0_1}$=-1, $A_{1_1}$=-1.

For sending mode 2, if sampling points of a useful symbol part of transmission symbol 2 are (-a,-b,-c,-d,-e,-f,-g) and its prefix length is 3, the content of the prefix part is (-e,-f,-g). Transmission symbol 0 (k=0) and symbol 1 (k=1) may be obtained respectively according to the formula provided in the embodiments of the disclosure:

$$x_{k_2}(n) = A_{k_2} \cdot x_{m_2}\left(\mathrm{mod}\left(N+n-\sum_{i=k_2+1}^{m_2} L(i), N\right)\right),$$

where $A_{k_2}$ is a preset parameter, $A_{0_2}$=-1, $A_{1_2}$=1.

It can be seen in FIG. 6 that for sending mode 0, the useful symbol part and the prefix part of three consecutive symbols are linked together to form a sequence (a,b,c,d,e,f,g, a,b,c, d,e,f,g, a,b,c,d,e,f,g); for sending mode 1, the useful symbol part and the prefix part of three consecutive symbols are linked together to form a sequence (-a,-b,-c,-d,-e,-f,-g, -a,-b,-c,-d,e,f,g, a,b,c,d,e,f,g); and for sending mode 2, the useful symbol part and the prefix part of three consecutive symbols are linked together to form a sequence (a,b,-c,-d,-e,-f,-g, -a,-b,-c,-d,-e,-f,-g, -a,-b,-c,-d,-e,-f,-g).

The receiver may not need to care about the existence of several CP types and each type of CP length in this mode, and use the sequence in the above three sending modes to correlate to the receiving sequence, so that the sending modes adopted by the sender may be distinguished. That is, there are several CP types and each type of CP length.

The method does not need to distinguish CP types and lengths when detecting, reduces the blind detection count, reduces the complexity, and can further distinguish the sending modes adopted by the sender.

Example 5

FIG. 7 shows a schematic diagram of sending a synchronization signal on consecutive M=2 symbols with CPs based on a cyclic shift method. FIG. 7 exemplarily shows two sending modes. It is assumed that there are two CP lengths in two sending modes, and $m_q=1$ (other symbols are cyclic shifts of this symbol). Without loss of generality, it is assumed in FIG. 7 that at a specific sampling frequency, the useful symbol parts of all transmission symbols in the two sending modes include N=7 sampling points, and the useful symbol part of sending mode 1 is the conjugate of mode 0. The number of sampling points in the CP part in mode 0 is 2, and the number of sampling points in the CP part in sending mode 1 is 3.

For sending mode 0, if sampling points of a useful symbol part of transmission symbol 1 are (a,b,c,d,e,f,g) and its prefix length is 2, the content of the prefix part is (f,g). Transmission symbol 0 (k=0) may be obtained according to the formula provided in the embodiments of the disclosure:

$$x_{k_0}(n) = A_{k_0} x_{m_0} (\mathrm{mod}(N+n-\Sigma_{i=k_0+1}^{m_0} L(i), N)),$$

where $A_{k_0}$ is a preset parameter, $k_0=0$, and $A_{0_0}=1$. For sending mode 1, if sampling points of a useful symbol part of transmission symbol 1 are (a*,b*,c*,d*,e*,f*,g*) and its prefix length is 3, the content of the prefix part is (e*,f*,g*). Transmission symbol 0 ($k_1=0$) may also be obtained according to the formula of the disclosure:

$$x_{k_1}(n) = A_{k_1} x_{m_1} (\mathrm{mod}(N+n-\Sigma_{i=k_1+1}^{m_1} L(i), N)),$$

where $A_{k_1}$ is a preset parameter, $k_1=0$, and $A_{0_1}=1$.

It can be seen in FIG. 7 that for sending mode 0, the useful symbol part and the prefix part of two consecutive symbols are linked together to form a sequence (a,b,c,d,e,f,g, a,b,c, d,e,f,g); and for sending mode 1, the useful symbol part and the prefix part of two consecutive symbols are linked together to form a sequence (a*,b*,c*,d*,e*,f*,g*, a*,b*,c*, d*,e*,f*,g*).

The receiver may not need to care about the existence of several CP types and each type of CP length in this mode, and use the sequence in the above two sending modes to correlate to the receiving sequence, so that the sending modes adopted by the sender may be distinguished. That is, CP types are distinguished.

Because detection sequences of sending mode 0 and mode 1 are conjugate to each other, the calculation complexity of the two modes may be further reduced in the calculation. The method does not need to distinguish CP types and lengths when performing symbol timing, reduces the blind detection count, reduces the complexity, and can further distinguish sending modes adopted by the sender.

Example 6

An important way to achieve low-complexity PSS detection is to use a relatively low sampling frequency. When a subcarrier is 15 kHz, a sampling frequency used by a transmitting end is at least 1.92 MHz. The following table shows sampling points corresponding to a useful symbol part and a CP part when a receiver uses a sampling frequency of 1.92 MHz.

| Sampling frequency | Sampling points corresponding to one OFDM symbol (data part) | Sampling points corresponding to CP (normal CP) | Sampling points corresponding to CP (extended CP) |
|---|---|---|---|
| 1.92 MHz | 128 | 9/10 | 32 |

In consideration of that the bandwidth of a narrowband communication system is 180 kHz, a sampling frequency of 240 kHz should be a better choice. However, one of the defects is that the performance of both an extended CP and a normal CP may have large differences. Since there are 120 sampling points in 0.5 ms, in the case of the extended CP, the number of sampling points of CPs is 24, and each OFDM symbol corresponds to four sampling points. In the case of the normal CP, the number of CP sampling points in each OFDM symbol cannot be determined in advance, and may be 1 or 2. However, the length of a time domain represented by these sampling points is different from the length of the CP in the existing LTE. After the CP removing operation is performed, the accuracy of synchronization at the receiver is reduced.

However, when the above sampling frequency is adopted, since the receiver does not need to remove a CP, sampling points corresponding to multiple consecutive OFDM symbols (including useful symbol part sampling points and prefix part sampling points) are not truncated, thereby avoiding the aforementioned problem of reduction of synchronization accuracy due to the removal of the CP.

Example 7

FIG. 8 shows a schematic diagram of sending a synchronization signal at four spaced time domain positions. FIG. 8 shows two sending modes namely sending mode 0 and sending mode 1. For each sending mode, there are three consecutive OFDM symbols at each time domain position, and a common symbol is at $m_q=2$. Without loss of generality, it is assumed in FIG. 8 that at a specific sampling frequency, the useful symbol part of all transmission symbols in the two sending modes includes N=7 sampling points. The number of sampling points in the CP part in sending mode 0 is 2, and the number of sampling points in the CP part in sending mode 1 is 3. In the figure, the useful symbol content $x_{k_q}(n)$ of the $0^{th}$ and $1^{st}$ symbols at each time domain position in each sending mode is calculated by using a first rule, $A_{k_q}=1$, and $B_{k_q}=1$.

For sending mode 0, synchronization signals sent at four time domain positions are the same (when scrambling is not considered), the sender multiplies a scrambling code (+1, +1, +1, +1); and for sending mode 1, synchronization signals sent at four time domain positions are the same (when scrambling is not considered), and the sender multiplies a scrambling code (+1, −1, +1, −1).

After receiving the synchronization signals, the receiver may obtain symbol timings after performing sliding correlation calculation on the four time domain positions. Further, the correlation calculation values of the four positions are respectively multiplied by the scrambling codes (+1, +1, +1, +1) and (+1, −1, +1, −1), and sending mode types adopted by the sender may be distinguished by means of the size of a descrambling result. Because the two scrambling code calculations are performed after sliding correlation, they have little effect on the calculation complexity.

Example 8

FIG. 9 shows a schematic diagram of distinguishing different sending modes of a synchronization signal by means of symbol zeroing. In sending mode 0 in FIG. 9, there are 14 transmission symbols in a subframe, and there are 12 transmission symbols in a subframe in sending mode 1. The control symbols used to transmit control information in two sending modes occupy the first three transmission symbols of a subframe. The transmission symbols for transmitting a synchronization signal are the last nine transmission symbols of the above subframe, i.e., M=9. The CP lengths of M consecutive symbols in sending mode 0 and sending mode 1 are the same, and the CP length of mode 1 is greater than the CP length of mode 0.

In sending mode 0, the transmission symbols not used to transmit the synchronization signal and the control information in the subframe, i.e., symbol 3 and symbol 4 (symbols are numbered starting from 0), are set to zero, and for sending mode 1, the transmission symbols in the subframe are all used for transmitting the synchronization signal and the control signal, so there is no zero-setting symbol. Here, 0 is the specified value in the aforementioned embodiment.

Correspondingly, the receiver may determine the position and number of zero-setting symbols according to energy detection, thereby distinguishing different sending modes. Here, the synchronization signal is only used for the synchronization of symbols without the need to distinguish the sending modes.

The present embodiment provides a sender. The sender includes:

a sending unit, configured to send a synchronization signal or a part of the synchronization signal on M consecutive transmission symbols, wherein M is an integer no less than 2; and each of the transmission symbols includes a CP and a useful symbol part, and content carried in the CP is a last portion of content carried in the useful symbol part.

The sender in the present embodiment may be various types of base stations, such as an evolved Base Station (eNB). The sending unit may correspond to various sending interfaces of a base station, such as a sending antenna or a sending antenna array. In a specific implementation, the sender further includes various structures such as a forming unit, and the forming unit may be used to form the synchronization signal. The specific structure of the forming unit may correspond to a processor or a processing circuit or the like. The processor may include a structure such as an application processor, a central processor, a microprocessor, a digital signal processor, or a programmable array.

In short, the sender in the present embodiment transmits a synchronization signal on M consecutive transmission symbols, which can increase the gain of the synchronization signal received by the receiver and improve the synchronization accuracy.

Alternatively, there are Q sending modes for sending the synchronization signal; the Q is an integer no less than 2, where a CP length of at least one of the M transmission symbols in any one of the sending modes is different from that in any other of the sending modes.

Meanwhile, at least one common transmission symbol exists in M transmission symbols corresponding to each of the Q sending modes; and content carried in a useful symbol part of a common transmission symbol in any one of the sending modes is as same as or opposite to or conjugate to that in any other of the sending modes. Here, the common transmission symbols in the above-mentioned Q sending modes are distinguished from each other and are correlated to each other. This is favorable for the receiver to distinguish different sending modes, and also favorable for the receiver to detect synchronization signals sent by various sending modes by using similar structures.

Furthermore, an index of the common transmission symbol in a sending mode q is $m_q$, $m_q \in (0, 1, \ldots M-1)$, and a useful symbol part of the common transmission symbol $m_q$ carries $x_{m_q}(n)$, where n is 0 or a positive integer less than N; q is 0 or a positive integer less than Q; N is a positive integer, which is a number of sampling points included in a useful symbol part of the transmission symbol $m_q$; and a useful symbol part of a transmission symbol $k_q$ in the sending mode q is obtained by multiplying a cyclic shift of $x_{m_q}(n)$ by 1 or −1, or by conjugating a cyclic shift of $x_{m_q}(n)$. In the present embodiment, content carried by each transmission symbol is constructed by a common transmission symbol, which has the characteristics of simple implementation and simple detection at a receiver.

Alternatively, a useful symbol part of a transmission symbol $k_q$ in the transmission symbols of the sending mode q is $x_{k_q}(n)$, $k_q$ is 0 or a positive integer less than M and not equal to $m_q$.

When $k_q < m_q$, $$x_{k_q}(n) = A_{k_q} \cdot x_{m_q}\left(\mathrm{mod}\left(N + n - \sum_{i=k_q+1}^{m_q} L(i), N\right)\right),$$

where $A_{k_q}$ is a preset parameter that is not 0.

When $k_q > m_q$, $$x_{k_q}(n) = B_{k_q} \cdot x_{m_q}\left(\mathrm{mod}\left(n + \sum_{i=m_q+1}^{k_q} L(i), N\right)\right),$$

where $B_{k_q}$ is a preset parameter that is not 0.

L(i) is a length of a CP of an $i^{th}$ transmission symbol, where L(i) is an integer equal to or greater than 0.

The value of $A_{k_q}$ and $B_{k_q}$ is 1 or −1 preferably. Alternatively, $A_{k_q}$ is 1, and $B_{k_q}$ is 1.

In addition, a useful symbol part of a transmission symbol $k_q$ in the transmission symbols of the sending mode q is $x_{k_q}(n)$, $k_q$ is 0 or a positive integer less than M and not equal to $m_q$.

When $k_q < m_q$, $$x_{k_q}(n) = A'_{k_q} \cdot x^*_{m_q}\left(\mathrm{mod}\left(N + n - \sum_{i=k_q+1}^{m_q} L(i), N\right)\right),$$

where $A'_{k_q}$ is a preset parameter that is not 0.

When $k_q > m_q$, $$x_{k_q}(n) = B'_{k_q} \cdot x^*_{m_q}\left(\mathrm{mod}\left(n + \sum_{i=m_q+1}^{k_q} L(i), N\right)\right),$$

where $B'_{k_q}$ is a preset parameter that is not 0.

L(i) is a length of a CP of an $i^{th}$ transmission symbol, where L(i) is an integer equal to or greater than 0. The value of $A'_{k_q}$ and $B'_{k_q}$ may be 1 or −1. Of course, preferably, $A'_{k_q}$ and $B'_{k_q}$ are equal to 1.

$m_q$ is equal to M−1. The transmission symbol $m_q$ is set as a last transmission symbol of M consecutive transmission symbols, thereby facilitating symbol synchronization. It is further preferred that the transmission symbol $m_q$ is a last transmission symbol in a transmission slot or a transmission subframe. This facilitates subframe-level synchronization and transmission slot synchronization.

In addition, the sending unit is configured to send the synchronization signal on M consecutive transmission symbols. Or, the sending unit is specifically configured to send M consecutive transmission symbols at each of X mutually-spaced time domain positions, wherein each transmission symbol is used to send a corresponding part of the synchronization signal, where X is an integer no less than 1. In the present embodiment, the sender will send the M consecutive transmission symbols for X times separately.

In addition, M consecutive transmission symbols at a time domain position x are V(x), and the sender multiplies the synchronization signal of the time domain position x by a preset scrambling code r(x), where x is a positive integer less than X, where different sending modes correspond to different preset scrambling codes which can be used for the receiver to distinguish different sending modes.

In short, in the present embodiment, after receiving the synchronization signal sent by the sender, the receiver does not need to perform the operation of removing a CP, thereby reducing the detection complexity of the extracted synchronization signal and improving the synchronization accuracy of the synchronization signal.

A subframe in which the M transmission symbols for sending the synchronization signal are located is a first subframe; and the first subframe further includes a control symbol for transmitting control information.

The sending unit is further configured to use all or part of remaining transmission symbols other than the M transmission symbols and the control symbols in the first subframe to transmit a specified value, herein at least one of a number of specified values in the remaining transmission symbols or positions of the specified values in the remaining transmission symbols in any one of the sending modes is different from that in any other of the sending modes.

In this case, the sending unit can conveniently inform the receiver of a sending mode for currently sending a synchronization signal by sending the specified values on the remaining transmission symbols in the first subframe, so as to simplify detection of the synchronization signal.

In some embodiments, the CP includes S sampling points, wherein S is an integer greater than or equal to 0.

Figure 10:
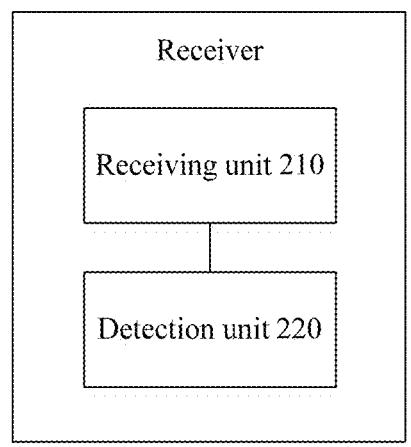
FIG. 10 is a schematic structure diagram of a receiver according to an embodiment of the disclosure.

As shown in FIG. 10, the present embodiment provides a receiver. The receiver includes:

a receiving unit 210, configured to receive a synchronization signal or a part of the synchronization signal sent on M consecutive transmission symbols by a sender, wherein M is an integer no less than 2, each of the transmission symbols includes a CP and a useful symbol part, and content carried in the CP is a last portion of content carried in the useful symbol part; and a detection unit 220, configured to detect the synchronization signal by using a sampling point sequence correlation.

The receiver in the present embodiment may be various terminal devices such as a narrowband communication terminal. The receiving unit 210 may include one or more receiving antennae.

The detection unit 220 may be various types of processors or processing circuits in the present embodiment. The processor may include an application processor, a central processor, a microprocessor, a digital signal processor, a programmable array, or the like. The processing circuit may include an application specific integrated circuit. In the present embodiment, a synchronization signal may be received from M continuously-distributed transmission symbols at a time, the receiving gain and detection accuracy of the synchronization signal are increased, and the synchronization accuracy can be improved.

At least one common transmission symbol exists in M transmission symbols corresponding to each of the Q sending modes; and content carried in a useful symbol part of a common transmission symbol in any one of the sending modes is as same as or opposite to or conjugate to that in any other of the sending modes.

The detection unit 220 is configured to: detect the synchronization signal by performing a sliding accumulative correlation on a useful symbol part of the common transmission symbol, serving as the sampling point sequence, and a received sequence; or, detect the synchronization signal by performing a sliding correlation on M-times repetitions of a useful symbol part of the common transmission symbol and the received sequence.

In the present embodiment, the receiver detects the synchronization signal by using a sliding accumulative correlation, or detects the synchronization signal by using M-times repetitions.

The detection unit 220 is configured to determine the sampling point sequence according to preset configuration parameters, wherein a length of the sampling point sequence is N*M, where N is a number of sampling points of a useful symbol part in the transmission symbol; or, the length of the sampling point sequence is N*(M+C), where C is an integer no less than 1. Obviously, in the present embodiment, the synchronization signal can be accurately detected with a high gain.

The receiving unit 210 is configured to receive the synchronization signal sent on M consecutive transmission symbols. Or, the receiving unit 210 is configured to receive M transmission symbols at each of X mutually-spaced time domain positions, wherein each transmission symbol is used to send a corresponding part of the synchronization signal.

The receiver further includes:

a descrambling unit, configured to descramble the transmission symbol by using a preset scrambling code. In the present embodiment, the descrambling unit may include a processor or a processing circuit. The processor may include a central processor, a microprocessor, a digital signal processor, a programmable array, and the like. The processing circuit may include an application specific integrated circuit. The processor or the processing circuit in the present embodiment can use the preset scrambling code to decode the transmission symbol. In addition, the receiver further includes:

a first determination unit, configured to determine a sending mode for sending the synchronization signal according to a preset scrambling code that correctly descrambles the transmission symbol and a mapping relationship between the preset scrambling code and the sending mode.

In the present embodiment, the first determination unit may also correspond to the above processor or processing circuit. The descrambling unit and the first determination unit may be integrated on the same processor or processing circuit or different processors correspondingly.

A subframe in which the M transmission symbols for sending the synchronization signal are located is a first subframe; and the first subframe further includes a control symbol for transmitting control information.

The receiving unit 210 is further configured to receive a specified value transmitted in all or part of remaining transmission symbols other than the M transmission symbols and the control symbol in the first subframe.

The receiver further includes:

a second determination unit, configured to determine a sending mode for a synchronization signal according to numbers of specified values and/or positions of the specified values in the remaining transmission symbols.

In the present embodiment, the receiving unit 210 is also multiplexed to receive the content carried on the remaining transmission symbols in the first subframe. The second determination unit may also correspond to a processor or a processing circuit in the receiver. The second determining unit may simply determine a sending mode for a synchronization signal according to the number of the specified values and/or the positions on the remaining transmission symbols, which may simplify the detection of the synchronization signal.

The embodiments of the disclosure also provide a computer storage medium. The computer storage medium stores a computer-executable instruction. The computer-executable instruction is used for executing at least one of the aforementioned methods, such as one or both of the aforementioned synchronization signal sending method and/or synchronization signal detection method, or methods as shown in FIG. 1 and/or FIG. 2.

The computer storage medium may be a Read-Only Memory (ROM), a Random Access Memory (RAM), a Flash, or the like, and may be a non-transient storage medium.

In several embodiments provided by the present application, it will be appreciated that the disclosed device and method may be implemented in another manner. The device embodiment described above is only schematic. For example, division of the units is only division of logical functions, and there may be additional division manners during practical implementation. For example, multiple units or assemblies may be combined or integrated to another system, or some characteristics may be omitted or may be not executed. In addition, coupling or direct coupling or communication connection between displayed or discussed components may be indirect coupling or communication connection, implemented through some interfaces, of the devices or the units, and may be electrical and mechanical or adopt other forms.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a second processing unit, each unit may also exist independently, and two or more than two units may also be integrated into a unit. The integrated unit may be implemented in a hardware form, and may also be implemented in form of hardware and software function unit.

Those of ordinary skill in the art may understand that all or some steps implementing the above-mentioned method embodiment may be completed by instructing relevant hardware via a program, the aforementioned program may be stored in a computer-readable storage medium, and when the program is executed, the steps in the above-mentioned method embodiment are executed; and the aforementioned storage medium includes: various media capable of storing program codes such as a mobile storage device, an ROM, an RAM, a magnetic disk or an optical disk.

The above is only specific implementation manners of the disclosure. However, the scope of protection of the disclosure is not limited thereto. Any modifications made in accordance with the principle of the disclosure shall be interpreted as falling within the scope of protection of the disclosure.

The invention claimed is:

1. A synchronization signal sending method, comprising:
sending a synchronization signal or a part of the synchronization signal on M consecutive transmission symbols;
wherein M is an integer no less than 2,
each of the transmission symbols comprises a Cyclic Prefix (CP) and a useful symbol part, and content carried in the CP is a last portion of content carried in the useful symbol part;
wherein there are Q sending modes for sending the synchronization signal, and Q is an integer no less than 2; and for each sending mode of the Q sending modes, at least one common transmission symbol exists in M consecutive transmission symbols corresponding to the sending mode, and content carried in a useful symbol part of the at least one common transmission symbol is as same as or opposite to or conjugate to content carried in a useful symbol part of a common transmission symbol corresponding to any other of the Q sending modes.

2. The method according to claim 1,
wherein a CP length of at least one of the M transmission symbols in any one of the Q sending modes is different from that in any other of the Q sending modes.

3. The method according to claim 1, wherein
a useful symbol part of a common transmission symbol $m_q$ in a sending mode q carries $x_{m_q}(n)$; where n is 0 or a positive integer less than N; q is 0 or a positive integer less than Q; N is a positive integer, which is a number of sampling points included in the useful symbol part of each transmission symbol, and $m_q$ is 0 or a positive integer less than M; and
a useful symbol part of a transmission symbol $k_q$ in the sending mode q is obtained by multiplying a cyclic shift of $x_{m_q}(n)$ by 1 or −1, or by conjugating a cyclic shift of $x_{m_q}(n)$, where $k_q$ is 0 or a positive integer less than M and not equal to $m_q$.

4. The method according to claim 3, wherein
the useful symbol part of the transmission symbol $k_q$ is $x_{k_q}(n)$;
when $k_q < m_q$, $$x_{k_q}(n) = A_{k_q} \cdot x_{m_q}\left(\mod\left(N + n - \sum_{i=k_q+1}^{m_q} L(i), N\right)\right),$$

where $A_{k_q}$ is a preset parameter that is not 0, and L(i) is a length of a CP of an $i^{th}$ transmission symbol;
when $k_q > m_q$, $$x_{k_q}(n) = B_{k_q} \cdot x_{m_q}\left(\mod\left(n + \sum_{i=m_q+1}^{k_q} L(i), N\right)\right),$$

where $B_{k_q}$ is a preset parameter that is not 0; and
L(i) is the length of a CP of an $i^{th}$ transmission symbol, where L(i) is an integer equal to or greater than 0.

5. The method according to claim 4, wherein $A_{k_q}$ is 1, and $B_{k_q}$ is 1.

6. The method according to claim 3, wherein the useful symbol part of the transmission symbol $k_q$ is $x_{k_q}(n)$;
when $k_q < m_q$, $$x_{k_q}(n) = A'_{k_q} \cdot x^*_{m_q}\left(\mathrm{mod}\left(N + n - \sum_{i=k_q+1}^{m_q} L(i), N\right)\right),$$

where $A_{k_q}'$ is a preset parameter that is not 0;
when $k_q > m_q$, $$x_{k_q}(n) = B'_{k_q} \cdot x^*_{m_q}\left(\mathrm{mod}\left(n + \sum_{i=m_q+1}^{k_q} L(i), N\right)\right),$$

where $B_{k_q}'$ is a preset parameter that is not 0; and
L(i) is a length of a CP of an $i^{th}$ transmission symbol, where L(i) is an integer equal to or greater than 0.

7. The method according to claim 3, wherein $m_q$ is equal to M-1.

8. The method according to claim 7, wherein a common transmission symbol $m_q$ is a last transmission symbol in a transmission slot or a transmission subframe.

9. The method according to claim 1, wherein sending the synchronization signal or the part of the synchronization signal on the M consecutive transmission symbols comprises:
sending the synchronization signal on the M consecutive transmission symbols.

10. The method according to claim 1, wherein sending the synchronization signal or the part of the synchronization signal on the M consecutive transmission symbols comprises:
sending the M consecutive transmission symbols at each of X mutually-spaced time domain positions, wherein each transmission symbol is used to send a corresponding part of the synchronization signal, where X is an integer no less than 1.

11. The method according to claim 10, wherein M consecutive transmission symbols at a time domain position x are V(x), and a sender multiplies a synchronization signal of the time domain position x by a preset scrambling code r(x), where x is a positive integer less than X,
where different sending modes correspond to different preset scrambling codes, and
the preset scrambling codes are used for a receiver to distinguish different sending modes.

12. The method according to claim 1, wherein a subframe in which the M transmission symbols for sending the synchronization signal are located is a first subframe; and the first subframe further comprises a control symbol for transmitting control information, the method further comprises:
transmitting a specified value using all or part of remaining transmission symbols other than the M transmission symbols and the control symbol in the first subframe,
wherein at least one of a number of specified values in the remaining transmission symbols or positions of the specified values in the remaining transmission symbols in any one of the sending modes is different from that in any other of the sending modes.

13. The method according to claim 1, wherein the CP comprises S sampling points, where S is an integer greater than or equal to 0.

14. A synchronization signal detection method, comprising:
receiving a synchronization signal or a part of the synchronization signal sent on M consecutive transmission symbols by a sender, wherein M is an integer no less than 2, each of the transmission symbols comprises a Cyclic Prefix (CP) and a useful symbol part, and content carried in the CP is a last portion of content carried in the useful symbol part; and
detecting the synchronization signal by using a sampling point sequence correlation;
wherein there are Q sending modes for sending the synchronization signal, and Q is an integer no less than 2; and for each sending mode of the Q sending modes, at least one common transmission symbol exists in M consecutive transmission symbols corresponding to the sending mode, and content carried in a useful symbol part of the at least one common transmission symbol is as same as or opposite to or conjugate to content carried in a useful symbol part of a common transmission symbol corresponding to any other of the Q sending modes.

15. The method according to claim 14, wherein
detecting the synchronization signal by using the preset sampling point sequence correlation comprises:
detecting the synchronization signal by performing a sliding accumulative correlation on a useful symbol part of the common transmission symbol, serving as the sampling point sequence, and a received sequence;
or,
detecting the synchronization signal by performing a sliding correlation on M-times repetitions of a useful symbol part of the common transmission symbol and a received sequence.

16. The method according to claim 14, wherein
detecting the synchronization signal by using the sampling point sequence correlation comprises:
determining the sampling point sequence according to preset configuration parameters, wherein a length of the sampling point sequence is N*M, where N is a number of sampling points included in a useful symbol part of each transmission symbol; or, a length of the sampling point sequence is N*(M+C), where C is an integer no less than 1.

17. A base station, comprising:
a sending antenna or a sending antenna array, used for sending a synchronization signal or a part of the synchronization signal on M consecutive transmission symbols,
wherein M is an integer no less than 2; and
each of the transmission symbols comprises a Cyclic Prefix (CP) and a useful symbol part, and content carried in the CP is a last portion of content carried in the useful symbol parts;
wherein there are Q sending modes for sending the synchronization signal, and Q is an integer no less than 2; and for each sending mode of the Q sending modes, at least one common transmission symbol exists in M consecutive transmission symbols corresponding to the sending mode, and content carried in a useful symbol part of the at least one common transmission symbol is as same as or opposite to or conjugate to content carried in a useful symbol part of a common transmission symbol corresponding to any other of the Q sending modes.

18. The base station according to claim 17,
where a CP length of at least one of the M transmission symbols in any one of the Q sending modes is different from that in any other of the Q sending modes.

\* \* \* \* \*